Patented Sept. 19, 1933

1,927,052

UNITED STATES PATENT OFFICE 1,927,052

ALUMINIUM SOLDER

Frederick Seymour Smith, Barrie, Ontario, Canada, assignor of one-half to Jesse Webster, Barrie, Ontario, Canada No Drawing. Application April 8, 1933
Serial No. 665,086

1 Claim. (Cl. 75—1)

The invention has for its object the production of an efficient and reliable solder for aluminium, one which can be easily and readily applied to the object to be soldered at a moderate heat. The solder may be manufactured in the conventional stick form for application by the usual soldering iron or it can be applied in other modes well known to the art.

There is a recognized difficulty in the soldering of aluminium in that owing to the greasy texture of aluminium it has been found difficult to discover a solder that will adhere firmly and permanently to it.

The present invention consists of a solder that has proven to be particularly efficacious for aluminium and has a low melting point and a smooth flow. It is admirably suited for the repair of utensils as well as the joining of parts in the manufacture of articles of this metal.

A very distinctive advantage of this invention is that it produces a solder that requires no flux.

The solder consists of the ensuing ingredients and the proportions herein stated:

| | Parts |
|---|---|
| Zinc | 24 |
| Tin | 12 |
| Mercury | 4 |
| Aluminium | 1 |

These elements and their proportions produce a solder that is highly efficient and particularly easy to use on account of its not requiring a flux. It is to be understood, however, that the proportions may be varied somewhat without seriously affecting its efficiency. In mixing the composition it has been found advantageous to melt the tin and add the zinc: then add the aluminium by stirring the preparation with a stirring rod of this metal which partly dissolves. The mercury is added subsequently and the dross removed. The molten metal is allowed to harden in moulds to produce the usual sticks or pencils for soldering purposes. The mercury is an important constituent of the solder as it enables the solder to readily flow when heated and counteracts the greasy texture of the aluminium.

What I claim is:—

An aluminium solder composed of zinc 24 parts, tin 12 parts, mercury 4 parts, and aluminium 1 part.

FREDERICK SEYMOUR SMITH.